United States Patent Office 2,773,033
Patented Dec. 4, 1956

2,773,033

LUBRICANT COMPOSITIONS AND TREATMENT

John D. Bartleson, Beachwood Village, Ohio, and Margaret L. Christoph, Wilmington, Del., assignors to The Standard Oil Company, Cleveland, Ohio, a corporation of Ohio No Drawing. Application March 24, 1953,
Serial No. 344,462

20 Claims. (Cl. 252—32.7)

This invention relates to compositions comprising an oil-soluble copper salt, such as copper naphthenate, and improved phosphorus sulfide-oxygen-containing organic compound-olefin polymer reaction products, especially phosphorus sulfide-ester wax-olefin polymer reaction products, which have been treated with solid potassium hydroxide, and to improved lubricant compositions containing the same.

In U. S. Patent No. 2,566,241, dated August 28, 1951, there are described the reaction products of oxygen-containing organic compounds of high molecular weight with an olefin polymer and phosphorus sulfide. These lubricant additives are suitable for use under various conditions including high temperatures or high pressure, or both. Under certain circumstances, however, these lubricating additives in use may display a tendency to darken and may also liberate hydrogen sulfide, which may render the lubricant composition offensive to the consumer although not affecting the lubricants' engine performance characteristics.

In accordance with the instant invention, the lubricants and lubricant additives described in patent No. 2,566,241 are caused to react with solid potassium hydroxide in an amount in excess of that which leads to an increase in the ash content of the additive, usually in excess of one equivalent of potassium hydroxide per mole of the additive. To the resulting product is added a small amount of an oil-soluble copper salt, such as copper naphthenate. The composition obtained as a result of this has improved properties, particularly improved color and color stability and stability against liberation of hydrogen sulfide, and better engine performance characteristics.

I. REACTION WITH POTASSIUM HYDROXIDE

The potassium hydroxide employed in the process of the invention should be in the solid form and preferably is substantially anhydrous. It is possible, however, to employ with advantage the commercial forms, such as solid flake potassium hydroxide, containing up to approximately 20% water.

The reaction with potassium hydroxide is effected without the addition of supplemental water. Aqueous potassium hydroxide solutions tend deleteriously to affect the corrosion inhibition properties of the treated additive, some additives so treated failing to meet accepted standards for corrision inhibition, and also detract from the antioxidant properties of the additive, demonstrated by the poor used oil analyses of lubricants containing the additives treated therewith. In contrast, additives treated with solid potassium hydroxide in accordance with the invention are better in these characteristics than the untreated additive.

In this respect, the invention is to be distinguished from the process of treating phosphorus sulfide-organic compound reaction products with aqueous potassium hydroxide alone or with other ingredients. The presence of water in excess of the amount of 20% occluded in the solid potassium hydroxide used in the instant process is definitely undesirable and disadvantageously affects the properties of the finished additives.

Any amount of potassium hydroxide that is in excess of the amount which increases the ash content of the additive will improve the product. It may be noted that the reaction of the acidic initial phosphorus sulfide oxygen-containing organic compound olefin polymer reaction products with metal bases, such as potassium hydroxide, first produces the corresponding metal derivatives. These salts are detergent type additives and the metal of the base enters the molecule of the additive, where its presence is confirmed by the increase in the ash content of the additive.

In accordance with the invention it has been ascertained that an amount of potassium hydroxide in excess of that resulting in an increase in the ash content of phosphorus sulfide-oxygen-containing organic compound olefin polymer reaction products will lead to a further improvement in the properties of the lubrating oil additive. Approximately one equivalent of potassium hydroxide will neutralize one mole of the acidic phosphorus sulfide oxygen-containing organic compound-olefin polymer reaction product described in U. S. Patent No. 2,566,241. In accordance with the invention, an amount of potassium hydroxide in excess of this is reacted with the said reaction product.

Although any amount of potassium hydroxide in excess of one equivalent will effect a further improvement in properties, it is preferred to employ at least about 1.25 equivalents of potassium hydroxide. The amounts within the range from 1.25 to 2 equivalents show a considerable improvement in additive properties, particularly in color, color stability, stability against liberation of hydrogen sulfide, and engine performance characteristics. Amounts in excess of two equivalents are useful, but the improvement obtained begins to lessen when three or more equivalents of potassium hydroxide are reacted, and a new increase in ash content occurs, indicating that a different reaction is taking place. Accordingly, there is no reason to use more than approximately three equivalents of potassium hydroxide in the process of the invention, and this amount represents the usual upper limit of potassium hydroxide employed.

The reaction is conducted employing solid potassium hydroxide. The solid forms of potassium hydroxide available in commerce contain a small proportion of occluded water. Commercial flake potassium hydroxide, for example, contains approximately 12 to 15% water. Such water in amounts up to approximately 20% does not have a deleterious effect upon the reaction. It is important to note, however, that aqueous solutions of potassium hydroxide cannot be employed. Evidently, the reaction takes a different course when the potassium hydroxide is in solution in water. It is not understood why water of solution and water occluded in solid potassium hydroxide should have such a different effect. Perhaps the effect is due to a change in the potassium hydroxide, which would be ionized in solution.

The reaction is carried out at an elevated temperature, generally in excess of 150° F. and preferably at least part of the reaction is conducted at 250° F. or above. The upper limit is determined by the stability of the reaction product and is not critical. The reaction time is a function of the temperature, potassium hydroxide concentration, rate of mixing and like reaction conditions, and likewise cannot be definitely specified. At a reaction temperature of 180° to 250° F. a reaction time of two hours or more is indicated while at more elevated temperatures, say 300° F., one and one-half to one and three-quarters hours is more than ample.

The reaction leads to a loss in the sulfur content of the additive, but this does not detract from its engine performance characteristics. To counteract this, or to add sulfur, the reaction product can be reacted with sulfur or another element of the sulfur family, i. e., sulfur, selenium or tellurium, can be incorporated into the reaction product. This sulfur can be incorporated by adding elemental sulfur or a compound which yields sulfur, such as by treating the sulfide-derived reaction product therewith, or treating a derivative of the sulfur-derived reaction product therewith.

At the conclusion of the reaction, insoluble and precipitated materials are separated from the reaction mixture. This can be done by any conventional methods, including filtration, gravity settling, and centrifuging. The desired improved additive is recovered as the filtrate or centrifugate or is decanted, depending upon the process used. If desired, the final product can be distilled and extracted with a suitable solvent, e. g., liquid propane, isopropyl alcohol, acetone, and other solvents known in the art, to remove insolubles.

Inasmuch as the potassium hydroxide in excess of one equivalent which reacts with the reaction product does not enter the molecule of the additive, it is thought that it combines with other materials present and probably soluble in the starting material but rendered insoluble in the course of the reaction so that they are removed at the conclusion of the reaction by the separation techniques referred to. The nature of these materials is not fully understood. It is possible that the starting reaction product contains a certain proportion of phosphorus- or sulfur-containing acids which, if present in the lubricating oil, would be expected to have a deleterious effect, probably acting as catalyst for undesirable reactions. The potassium salts of these acids would be expected to be oil-insoluble salts, e. g., phosphates, sulfates, etc. and therefore would be recovered in the residue which is separated from the reaction mixture. This explanation is being checked by further research and is advanced here only as one possible explanation of the improved results obtained by the process of the invention.

The process is applicable to any of the phosphorus sulfide-oxygen-containing organic compound-olefin polymer reaction products described in U. S. Patent No. 2,566,241. Particularly advantageous results are obtained when the process is applied to phosphorus sulfide-ester wax-olefin polymer reaction products. A large variety of ester waxes are reactive with phosphorus sulfides and are suitable, for example, degras, beeswax, sperm oil and hydrogenated sperm oil. Degras is a crude grease obtained by washing sheep's wool, and contains several components reactive with phosphorus sulfides. Degras itself and fractions derived therefrom and reactive with phosphorus sulfides can be used. Because of its versatility degras is a preferred ester wax. In general, aliphatic ester waxes having from twelve to generally not over twenty carbon atoms are employed, although compounds of up to fifty carbon atoms or more are suitable. Both straight and branched chain saturated and unsaturated aliphatic ester waxes can be used. Illustrative of some conveniently applicable ester waxes in addition to those referred to above are lanolin, cetyl stearate, ceryl cerotate, ceryl palmitate, myricyl palmitate, octadecyl palmitate, cetyl cerotate, ceryl stearate, cetyl palmitate, spermaceti, insect wax, carnauba wax, wool wax, and other waxes.

In the broader aspects of the invention, there may be used an oxygen-containing compound containing hydroxy, carbonyl, or ether oxygen, and desirably of rather high molecular weight, preferably having a boiling point of at least 225° F. The reaction may be conducted under pressure, if desired, in the case of lower boiling materials. There may be used esters, as alkyl or cycloparaffin or aryl esters of organic acids; fatty oils, higher alcohols, higher carboxylic acids, saturated and unsaturated, monobasic and dibasic, petroleum acids, naphthenic acid, rosin, modified rosin, glycol ethers, higher ketones and aldehydes; also halogenated derivatives of any of these. Illustrative of some conveniently applicable materials are: beeswax, sperm oil, other waxes, butyl stearate, ethyl lactate, methyl oleate, butyl ricinoleate, butyl phthalate, methyl stearate, methyl dichlorostearate, methyl chloro-naphthenate, dichloro-palmitic acid, coconut oil, babassu oil, hydrogenated coconut and other vegetable oils, other fatty oils, ethylene glycol monoethers, diglycol chlorohydrin, lauryl alcohol, stearic acid, lauric acid, oleic acid, palmitic acid, myristic acid, naphthalic acid, naphthoic acid, benzoic acid, naphthenic acids, hydroxystearic acid, dihydroxybenzoic acid, hydroxynaphthenic acids, dihydroxystearic acid, chlorobenzoic acid, dichlorostearic acid, dichlorobenzoic acid, dichlorodihydroxystearic acid, lactones, palmitone, oxidized petroleum fatty acid or other petroleum product, as oxidized wax, kerosene, gas oil or other oxidized petroleum oil. The oxygenated compound used in forming the reaction product should be selected with reference to the use of the final composition and properties desired in it, e. g., to give a reaction product having oil solubility or dispersibility.

Any of the olefin polymers referred to in U. S. Patent No. 2,566,241 can be employed. The polyolefin which may be used is one which improves the viscosity index of lubricating oil, e. g., one having a molecular weight of about 2,000 to 100,000 and which is soluble in lubricating oils. These materials are substantially saturated as the art will appreciate. As mentioned above, such materials are known in the art. Paratone is preferred. This is a polyisobutylene of 10,000 to 20,000 molecular weight, in solution in an oil in an amount to give a viscosity of 3,000 SSU at 210° F.

Any phosphorus sulfide can be employed, phosphorus pentasulfide being preferred.

II. ADDITION OF OIL-SOLUBLE COPPER SALT

The reaction product obtained following the potassium hydroxide treatment has improved color and color stability, better engine performance characteristics, and improved stability against liberation of hydrogen sulfide.

The product meets requirements with respect to its hydrogen sulfide stability but in many instances appreciable amounts of hydrogen sulfide will be liberated in storage under extraordinary conditions such as elevated temperatures. In accordance with the invention, the stability of this product against liberation of hydrogen sulfide is appreciably increased by incorporating therewith an oil-soluble copper salt.

Copper salts of organic compounds which are oil-soluble and can be employed in the compositions of the invention include copper naphthenate, copper tertiary dodecyl mercaptide and copper acetyl acetone. Oil-solubility is imparted by the organic radical which as the examples show can be aliphatic, aromatic, or cycloaliphatic in nature. The organic radical can be derived from an organic acid, alcohol or mercaptan; that is, any copper salt of a salt-forming organic compound which is soluble in the mineral lubricating oil can be employed. Copper naphthenate is preferred.

Any amount of oil-soluble copper salt will improve the composition. Usually amounts within the range of 0.01% to 1% will be employed, preferably from 0.05 to 0.5%. Amounts in excess of 1% do not harm the product but it will be appreciated that as the amount increases a limiting point is reached after which hydrogen sulfide liberation has been so effectively reduced that no further improvement will be obtained with the use of larger amounts. The amount used should be sufficient to substantially eliminate liberation of the hydrogen sulfide, and amounts in excess of this will not be economic.

In the examples that follow the composition's stability against liberation of hydrogen sulfide is determined by the lead acetate test. A piece of filter paper saturated with lead acetate solution is suspended over the sample and the formation of lead sulfide is noted by change in color. This is a simple test and is made after storage of a 50% solution of the composition in an SAE No. 20 lubricating oil at 150° F. for the period specified. The test is sensitive to 2 p. p. m. of H₂S.

*Example A*

Twenty parts by weight of $P_2S_5$ was mixed with a portion of 100 parts of a neutral diluent lubricating oil to form a slurry and this was mixed with 25 parts of degras (a high molecular weight ester mixture derived from wool fat) and 75 parts of Paratone (a polyisobutylene having a molecular weight of 10,000 to 20,000 in solution in an oil in an amount to give a viscosity of 3,000 SSU at 210° F.). The balance of the neutral diluent oil was added and the mixture reacted with agitation for one hour at 300° F., allowed to settle, decanted and filtered. The product analyzed 3.90% sulfur and 1.20% phosphorus (7.8% sulfur and 2.4% phosphorus excluding the neutral oil).

A portion of this additive was reserved for further testing. A portion was treated with clay to produce the additive of Example B, and the remainder was employed in the preparation of Example C which follows.

*Example B*

A portion of Example A was treated with 4% by weight of clay in accordance with conventional procedure, in order to improve its color. The resulting material is referred to hereinafter as the additive of Example B.

*Example C*

One hundred part portions of the additive of Example A, as a 50% solution in a solvent-extracted neutral oil, 225 SSU at 100° F., were heated for one hour at 180° F. and one hour at 250° F. with two equivalents of flake potassium hydroxide containing about 15% water. The reaction mixture then was blown with air for an additional thirty minutes to remove water liberated in the course of the reaction. Filter aid (3%) was added and the mixture filtered to remove excess unreacted potassium hydroxide and insoluble residual material. The concentration of additive in the oil was adjusted to 50%, and this concentrate used in the examples which follow.

*Example 1*

To two portions of the reaction product obtained in Example C there was added 0.1% and 0.2%, respectively, of copper naphthenate. The resulting composition was subjected to the lead acetate test to determine stability against liberation of hydrogen sulfide. The 50% solution of the potassium hydroxide-treated additive in a solvent-extracted neutral oil (225 SSU 100° F.) containing the copper naphthenate was stored over two nights at 150° F. and checked after the first and second nights. Reaction of lead acetate paper was negative in each case. In contrast, a control sample of Example C gave a positive reaction each time.

To another portion of Example C was added 0.25% copper naphthenate. The composition (No. B in Table I below) was subjected to the Sohio corrosion test (see U. S. Patent No. 2,560,547 to John D. Bartleson, dated July 17, 1951) in comparison with a control (No. A in Table I below) which did not contain the copper naphthenate, with the following results:

TABLE I

| No. | Concen. of Cu soap, percent | Cu-Pb Corr. | Vis. inc., SUS | Pen. ins. | Neut. No. | Lacquer | Sludge |
|---|---|---|---|---|---|---|---|
| A | 0 | 15.7 | 106 | 1.14 | 1.5 | A— | A |
| B | 0.25 | 7.9 | 116 | 1.17 | 1.4 | A | A |

The addition of copper naphthenate to the potassium hydroxide-treated additive slightly increased the viscosity increase but the copper-lead corrosion was greatly reduced. There was no material change in neutralization number, and lacquer and sludge ratings.

The compositions were subjected to the L–4 Chevrolet engine test with the following results:

TABLE II

| | A | B |
|---|---|---|
| Concen. Cu naphthenate in additive......percent... | | 0.10 |
| Concen. additive in oil..................do.... | 4.0 | 3.7 |
| Added sulfur........................do.... | 0.10 | 0.11 |
| Over-all rating............................ | 83.75 | 91.50 |
| Varnish............................. | 39.00 | 43.00 |
| Piston skirt......................... | 5.75 | 7.00 |
| Rocker-arm cover plate............... | 9.00 | 9.50 |
| Push-rod cover plate................. | 9.50 | 9.50 |
| Cylinder walls....................... | 5.25 | 7.50 |
| Crankcase oil pan.................... | 9.50 | 9.50 |
| Sludge rating............................. | 44.75 | 48.50 |
| Rocker-arm assembly................. | 9.00 | 9.75 |
| Rocker-arm cover plate............... | 9.00 | 9.75 |
| Push-rod cover plate................. | 8.00 | 9.25 |
| Oil screen........................... | 9.75 | 10.00 |
| Crankcase oil pan.................... | 9.00 | 9.75 |
| Cu-Pb corrosion........................... | 76 | 59 |
| Viscosity increase, SSU.................... | 85 | 101 |
| Pentane insolubles, percent................ | 2.72 | 2.0 |
| Benzene insoluble, percent................. | 2.04 | 1.58 |
| Neutralization number..................... | 1.1 | 1.0 |
| Demerit rating............................ | 8.0 | 5.4 |

It can be seen that the copper naphthenate considerably improves the engine performance of the potassium hydroxide-treated additive.

Lead naphthenate and mercury naphthenate can be substituted for copper naphthenate in the compositions of this example with equivalent results.

*Example 2*

To a portion of the additive of Example A was added 0.5% of copper naphthenate. A similar amount of copper naphthenate was added to the additive of Example A which had not been treated with solid potassium hydroxide.

Each composition was subjected to the Sohio corrosion test with the following results:

TABLE III

| | Corrosion | Viscosity Increase | Pentane, Percent Insolubles | Neutralization Number | Lacquer Rating | Sludge Rating |
|---|---|---|---|---|---|---|
| 4.85% additive A<br>0.5% Cu naphthenate | 9.0 | 124 | 1.88 | 1.8 | C | B— |
| 4.85% additive A<br>No naphthenate | 12.4 | 123 | 1.52 | 1.2 | B | A— |

It is evident that when the additive is not first treated with potassium hydroxide the addition of copper naphthenate thereto impairs the engine performance characteristics of the additive, particularly in sludge and lacquer rating. On the other hand, as shown in Example 1, Table I, when the additive is first treated with potassium hydroxide the treatment with copper naphthenate does not impair engine performance, and in fact, has excellent lacquer and sludge characeristics.

*Examples 3 to 5*

To portions of the reaction product obtained in Example C there was added one of the copper salts listed in the table below at the concentration indicated. The resulting composition was subjected to the following test to determine the amount of hydrogen sulfide liberated under severe storage conditions. The 50% solution of the additive in a solvent extracted nutrient oil (225 SSU at 100° F.) was stored overnight at 150° F. Thereafter nitrogen was bubbled through a sample of about 40 g. of the stored material and the hydrogen sulfide liberated absorbed in caustic soda solution. The resulting solution was titrated with iodine and sodium thiosulfate and the results converted into p. p. m. of $H_2S$. The results were as follows:

TABLE IV

| Example No. | Compound | Percent Concentration | $H_2S$ (p. p. m.) |
|---|---|---|---|
| Control | No additive | | 12.5 |
| 3 | Copper naphthenate | 0.1 | 7.5 |
| | | 0.3 | 1.4 |
| 4 | Copper t-dodecyl mercaptide | 0.1 | 6.1 |
| | | 0.2 | 1.1 |
| 5 | Copper acetyl acetone | 0.05 | pos. |
| | | 0.1 | 5.5 |

The results show that the copper naphthenate, copper tertiary dodecyl mercaptide and copper acetyl acetone are effective in reducing the amounts of hydrogen sulfide liberated after storage at 150° F. This temperature is appreciably above temperatures normally encountered and it would be expected that a composition having the properties indicated in the table would have satisfactory properties in use from the standpoint of $H_2S$ stability.

The compositions of the invention have a good O. D. color and color stability to such an extent that clay treatment is unnecessary, and in addition hydrogen sulfide stability is greatly improved. The neutralizaion number is low. Varnish formation is nearly eliminated. The demerit rating of the composition is good, as measured by the L-4 Chevrolet engine test. The sulfur content is lower and the ash content higher, but both are well within the permissible limits, and the treated additive is more soluble in the oil.

The properties of the additives are improved the most by the larger amounts of potassium hydroxide, two equivalents of potassium hydroxide being the optimum.

The compositions of the invention are useful as lubricating oil additives. The amount of the composition to be incorporated in an oil or grease will depend upon the characteristics of the oil or grease and the intended use. Some oils have more of a tendency to corrode metals or to form acids, sludge and lacquer deposits than others, and such oils require larger amounts of the additive. Also, oils that are intended for use at higher temperatures require larger amounts of the additive. In general the range is from about 0.5% to about 10% composition by weight of the oil. Under some circumstances amounts as low as about 0.01% show a significant improvement. Since the composition of the invention is itself a lubricant there is no upper limit in the amount that can be added to the oil. However, it may be uneconomical to include in the lubricant more of the composition of the invention than is necessary to impart the desired properties and from this standpoint, generally not over 50% of the composition would be used.

If desired, the compositions of the invention may be used together with other oil addition agents, e. g., pour point depressants or film strength agents. In some instances it is desirable to include in the lubricating oil containing the composition an agent for improving the clarity of the oil, e. g., lecithin, lauryl alcohol and the like, which are well known to the art, and in order to prevent foaming of the oil it is desirable in some cases to add small amounts of tetra-amyl silicate, an alkyl ortho carbonate, ortho formate or ortho acetate, or polyalkylsilicone oil.

All parts and percentages in the specification and claims are by weight, and weights of additive and oil-soluble copper salt are based on the weight of the oil unless otherwise indicated.

We claim:

1. An oil-dispersible composition suitable for use as a lubricant additive comprising from about 0.01% to about 1% of an oil-soluble copper salt dispersed in the reaction product of a phosphorus sulfide-oxygen-containing organic compound-olefin polymer reaction product, the oxygen-containing organic compound being selected from the group consisting of those compounds containing hydroxy, carbonyl, ether and carboxy radicals, and having a boiling point of at least 225° F. with potassium hydroxide produced by reacting the last-mentioned reaction product with an amount of solid potassium hydroxide in excess of the amount required just to neutralize the reaction product within the range from over 1.25 equivalent up to about three equivalents per mole of the said reaction product at an elevated temperature at which the materials react for a time to complete the reaction and, separating insoluble materials from the reaction mixture to obtain an improved reaction product, and characterized by improved color, color stability and stability against liberation of hydrogen sulfide.

2. A composition in accordance with claim 1 in which the oxygen-containing organic compound is an ester wax.

3. A composition in accordance with claim 1 in which the oxygen-containing organic compound is degras.

4. A composition in accordance with claim 1 in which the phosphorus sulfide is phosphorus pentasulfide.

5. A composition in accordance with claim 1 in which the olefin polymer is a polyisobutylene.

6. A composition in accordance with claim 1 in which the oil-soluble copper salt is a salt of an organic acid.

7. A composition in accordance with claim 1 in which the oil-soluble copper salt is copper naphthenate.

8. A composition in accordance with claim 1 in which the oil-soluble copper salt is copper acetyl acetone.

9. A composition in accordance with claim 1 in which the oil-soluble copper salt is a salt of a mercaptan.

10. A composition in accordance with claim 1 in which the oil-soluble copper salt is copper t-dodecyl mercaptide.

11. A lubricating composition comprising a major amount of a mineral lubricating oil and a minor amount sufficient to inhibit the oxidative deterioration of the oil in service of the composition of claim 1.

12. A lubricating composition comprising a major amount of a mineral lubricating oil and a minor amount sufficient to inhibit the oxidative deterioration of the oil in service of the composition of claim 6.

13. A lubricating composition comprising a major amount of a mineral lubricating oil and a minor amount sufficient to inhibit the oxidative deterioration of the oil in service of the composition of claim 7.

14. A lubricating composition comprising a major amount of a mineral lubricating oil and a minor amount sufficient to inhibit the oxidative deterioration of the oil service of the composition of claim 8.

15. A lubricating composition comprising a major amount of a mineral lubricating oil and a minor amount sufficient to inhibit the oxidative deterioration of the oil in service of the composition of claim 9.

16. A lubricating composition comprising a major amount of a mineral lubricating oil and a minor amount sufficient to inhibit the oxidative deterioration of the oil in service of the composition of claim 10.

17. An oil-dispersible composition suitable for use as a lubricant additive comprising from about 0.01% to about 1% of copper naphthenate dispersed in the reaction product of phosphorus pentasulfide-degras-polyisobutylene reaction product with potassium hydroxide produced by reacting the last-mentioned reaction product with an amount of solid potassium hydroxide in excess of the amount required just to neutralize the reaction product within the range from over 1.25 equivalent up to about three equivalents per mole of the said reaction product at an elevated temperature at which the materials react for a time to complete the reaction and, separating insoluble materials from the reaction mixture to obtain an improved reaction product, and characterized by improved color, color stability and stability against liberation of hydrogen sulfide.

18. A lubricating composition comprising a major amount of a mineral lubricating oil and a minor amount sufficient to inhibit the oxidative deterioration of the oil in service of the composition of claim 12.

19. An oil-dispersible composition suitable for use as a lubricant additive comprising from about 0.01% to about 1% of copper acetyl acetone dispersed in the reaction product of phosphorus pentasulfide-degras-polyisobutylene reaction product with potassium hydroxide produced by reacting the last-mentioned reaction product with an amount of solid potassium hydroxide in excess of the amount required just to neutralize the reaction product within the range from over 1.25 equivalent up to about three equivalents per mole of the said reaction product at an elevated temperature at which the materials react for a time to complete the reaction and, separating insoluble materials from the reaction mixture to obtain an improved reaction product, and characterized by improved color, color stability and stability against liberation of hydrogen sulfide.

20. An oil-dispersible composition suitable for use as a lubricant additive comprising from about 0.01% to about 1% of copper t-dodecyl mercaptide dispersed in the reaction product of phosphorus pentasulfide-degras-polyisobutylene reaction product with potassium hydroxide produced by reacting the last-mentioned reaction product with an amount of solid potassium hydroxide in excess of the amount required just to neutralize the reaction product within the range from over 1.25 equivalent up to about three equivalents per mole of the said reaction product at an elevated temperature at which the materials react for a time to complete the reaction and, separating insoluble materials from the reaction mixture to obtain an improved reaction product, and characterized by improved color, color stability and stability against liberation of hydrogen sulfide.

References Cited in the file of this patent

UNITED STATES PATENTS

| | | |
|---|---|---|
| 2,316,091 | White | Apr. 6, 1943 |
| 2,367,468 | Mixon et al. | Jan. 16, 1945 |
| 2,510,031 | Folda | May 30, 1950 |
| 2,566,241 | Musselman | Aug. 28, 1951 |
| 2,637,722 | Frazier | May 5, 1953 |